United States Patent
Gong et al.

(10) Patent No.: US 7,951,439 B2
(45) Date of Patent: May 31, 2011

(54) CHLORINATED RUBBER COMPOSITION AND HOSE

(75) Inventors: Peng Gong, Kanagawa (JP); Satoshi Kaji, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/444,041

(22) PCT Filed: Jan. 16, 2008

(86) PCT No.: PCT/JP2008/050455
§ 371 (c)(1),
(2), (4) Date: Apr. 2, 2009

(87) PCT Pub. No.: WO2009/090737
PCT Pub. Date: Jul. 23, 2009

(65) Prior Publication Data
US 2010/0143630 A1   Jun. 10, 2010

(51) Int. Cl.
*B32B 1/08* (2006.01)
*B32B 25/00* (2006.01)
(52) U.S. Cl. ........ 428/36.8; 138/126; 138/127; 138/140
(58) Field of Classification Search .................. 428/36.8; 138/126, 127, 140
See application file for complete search history.

(56) References Cited

U.S. PATENT DOCUMENTS

| | | | | |
|---|---|---|---|---|
| 2,754,216 A | * | 7/1956 | Chenicek | 426/545 |
| 3,673,152 A | * | 6/1972 | Minagawa et al. | 524/83 |
| 3,887,518 A | * | 6/1975 | Rosenberger et al. | 524/194 |
| 3,907,925 A | * | 9/1975 | Cowell et al. | 156/307.7 |
| 3,933,737 A | * | 1/1976 | Glander et al. | 524/106 |
| 3,993,622 A | * | 11/1976 | Brunetti | 524/194 |
| 4,077,948 A | * | 3/1978 | Cowell et al. | 524/194 |
| 4,234,705 A | | 11/1980 | Matoba | |
| 4,306,930 A | * | 12/1981 | Cowell et al. | 156/307.7 |
| 4,427,816 A | * | 1/1984 | Aoki et al. | 524/357 |
| 4,455,204 A | * | 6/1984 | Pieslak et al. | 205/735 |
| 4,675,356 A | * | 6/1987 | Miyata | 524/424 |
| 4,764,562 A | * | 8/1988 | Tojo et al. | 525/281 |
| 4,877,817 A | | 10/1989 | Tojo et al. | |
| 5,215,581 A | * | 6/1993 | Stewart et al. | 106/471 |

(Continued)

FOREIGN PATENT DOCUMENTS
JP   2001226546   1/1970
(Continued)

OTHER PUBLICATIONS
International Search Report dated Apr. 15, 2008, for PCT/JP2008/050455.
(Continued)

*Primary Examiner* — Rena L Dye
*Assistant Examiner* — Michele Jacobson
(74) *Attorney, Agent, or Firm* — Connolly Bove Lodge & Hutz LLP

(57) ABSTRACT

A chlorinated rubber composition including a chlorinated rubber, a metal deactivator, an acid acceptor, and an antioxidant respectively at a particular amount is provided. The chlorinated rubber composition is capable of providing a chlorinated rubber composition which can be used in producing a hose exhibiting excellent resistance to degradation by zinc together with the sufficient physical properties such as resistance to thermal aging, oil resistance, and adhesion, as well as a hose produced by using such chlorinated rubber composition for the rubber layer.

6 Claims, 3 Drawing Sheets

U.S. PATENT DOCUMENTS

| | | | |
|---|---|---|---|
| 5,264,262 A * | 11/1993 | Igarashi | 428/36.9 |
| 5,348,779 A * | 9/1994 | Igarashi | 428/36.9 |
| 5,362,530 A * | 11/1994 | Kitami et al. | 428/36.2 |
| 5,470,919 A * | 11/1995 | Tojo et al. | 525/334.1 |
| 5,760,111 A * | 6/1998 | Birbaum et al. | 524/100 |
| 5,827,584 A * | 10/1998 | Akao et al. | 428/35.7 |
| 6,033,600 A * | 3/2000 | Henkins et al. | 252/400.24 |
| 6,682,796 B2 * | 1/2004 | Ito et al. | 428/36.91 |
| 6,919,389 B2 * | 7/2005 | Enlow et al. | 524/89 |
| 7,641,816 B2 * | 1/2010 | Mizumoto | 252/511 |
| 2003/0188793 A1 * | 10/2003 | Kanbe et al. | 138/126 |
| 2005/0009967 A1 * | 1/2005 | Zahalka et al. | 524/116 |
| 2006/0216518 A1 * | 9/2006 | Funayama et al. | 428/413 |
| 2008/0241449 A1 * | 10/2008 | Fukaya et al. | 428/36.8 |
| 2009/0104389 A1 * | 4/2009 | Gardi et al. | 428/35.2 |
| 2009/0192250 A1 * | 7/2009 | Ijichi et al. | 524/405 |

FOREIGN PATENT DOCUMENTS

| | | |
|---|---|---|
| JP | 59135243 | 8/1984 |
| JP | 60118728 | 6/1985 |
| JP | 62104806 | 5/1987 |
| JP | 2002249621 | 9/2002 |
| KR | 1993-003796 | 5/1993 |
| KR | 102004000207 | 1/2004 |

OTHER PUBLICATIONS

Extended European Search Reporting issued in corresponding European Application No. 08703316.3 dated Dec. 6, 2010.

* cited by examiner

CHLORINATED RUBBER COMPOSITION AND HOSE

CROSS REFERENCE TO RELATED APPLICATIONS

This application is a National Stage of PCT/JP2008/050455 filed Jan. 16, 2008, the entire contents of which are incorporated herein by reference.

TECHNICAL FIELD

This invention relates to a chlorinated rubber composition and a hose produced by using such chlorinated rubber composition.

BACKGROUND ART

Chlorinated rubbers (for example, chlorinated polyethylene rubbers and chlorosulfonated polyethylenes) have excellent properties such as resistance to thermal aging, oil resistance, cold resistance, weatherability, flame resistance, and electric properties, and they are used as the molding materials of various high pressure hoses as such as automobile power steering hoses; cable sheaths; gaskets; packings; and other molded articles.

Of such molding materials, the high pressure hoses produced by using a chlorinated rubber for the rubber layer should have sufficient resistance to degradation by zinc because, when such hoses become in contact with a metal part, and in particular, with zinc-plated joint at a high pressure and a high temperature, the chlorinated rubber constituting the rubber layer is rapidly and harshly degraded or hardened with cracks formation in the rubber layer or embrittlement or tearing of the rubber layer.

As a technique to solve such problems, patent document 1 discloses a composition for chlorinated polyethylene crosslinked rubber comprising (a) 100 parts by weight of chlorinated polyethylene, (b) 2 to 10 parts by weight of organic peroxide, (c) 3 to 20 parts by weight of crosslinking aid, and (d) 3 to 40 parts by weight of at least one acid acceptor selected from hydrotalcites and zeolites (claim 1).
Patent document 1: JP 2001-226546 A

DISCLOSURE OF THE INVENTION

Problems to be Solved by the Invention

However, the hose produced by using the composition for a chlorinated polyethylene crosslinked rubber of JP 2001-226546 A for the rubber layer was found to be insufficient in the resistance to degradation by zinc despite its sufficient physical properties such as resistance to thermal aging, oil resistance, and adhesion.

In view of the situation as described above, an object of the present invention is to provide a chlorinated rubber composition which can be used in producing a hose exhibiting excellent resistance to degradation by zinc together with the sufficient physical properties such as resistance to thermal aging, oil resistance, and adhesion. Another object of the present invention is to provide a hose produced by using such chlorinated rubber composition for the rubber layer.

Means to Solve the Problems

In order to solve the problems as described above, the inventors of the present invention made an intensive study and found that a hose exhibiting excellent resistance to degradation by zinc together with the sufficient physical properties such as resistance to thermal aging, oil resistance, and adhesion can be produced by using a chlorinated rubber composition containing a metal deactivator, an acid acceptor, and an antioxidant respectively at a particular amount in relation to the chlorinated rubber composition. The present invention has been completed on the bases of such finding.

Accordingly, the present invention provides the following (1) to (5):

(1) A chlorinated rubber composition comprising a chlorinated rubber, a metal deactivator, an acid acceptor, and an antioxidant, wherein
the metal deactivator is included at a content of at least 0.3 parts by weight in relation to 100 parts by weight of the chlorinated rubber,
the acid acceptor is included at a content of at least 1 parts by weight in relation to 100 parts by weight of the chlorinated rubber, and
the antioxidant is included at a content of 0.1 to 10 parts by weight in relation to 100 parts by weight of the chlorinated rubber.

(2) A chlorinated rubber composition according to (1) wherein the metal deactivator is at least one member selected from the group consisting of 1,2,3-benzotriazole, 3-(N-salicyloyl)amino-1,2,4-triazole, decamethylenedicarboxylic acid disalicyloylhydrazide, N,N'-bis[3-(3,5-di-t-butyl-4-hydroxyphenyl)propionyl]hydrazine, 2,2'-oxamidebis[ethyl 3-(3,5-t-butyl-4-hydroxyphenyl)propionate], oxalic acid bisbenzylidenehydrazide, isophthalic acid bis(2-phenoxy propionylhydrazide), 2,4,6-triamino-1,3,5-triazine, ethylenediaminetetraacetic acid, alkali metal (such as Li, Na, or K) salt of ethylenediaminetetraacetic acid, tris[2-t-butyl-4-thio(2'-methyl-4'-hydroxy-5'-t-butyl) phenyl-5-methyl]-phenyl phosphite, and 3,9-bis[2-(3,5-diamino-2,4,6-triazaphenyl)ethyl]-2,4,8,10-tetraoxaspiro[5.5]undecane.

(3) A chlorinated rubber composition according to (1) or (2) wherein the acid acceptor is at least one member selected from the group consisting of Ca—Mg—Zn based complex stabilizer, hydrotalcite, and fatty acid metallic soap.

(4) A chlorinated rubber composition according to any one of (1) to (3) wherein the antioxidant is at least one member selected from the group consisting of phenol-based antioxidant, phosphorus-based antioxidant, and sulfur-based antioxidant.

(5) A hose comprising a rubber layer and a reinforcement layer adjacent to the rubber layer formed by using the chlorinated rubber composition of any one of (1) to (4).

Effects of the Invention

As described below, the present invention is capable of providing a chlorinated rubber composition which can be used in producing a hose exhibiting excellent resistance to degradation by zinc together with the sufficient physical properties such as resistance to thermal aging, oil resistance, and adhesion, as well as a hose produced by using such chlorinated rubber composition for the rubber layer.

DESCRIPTION OF SYMBOLS

Figure 1:
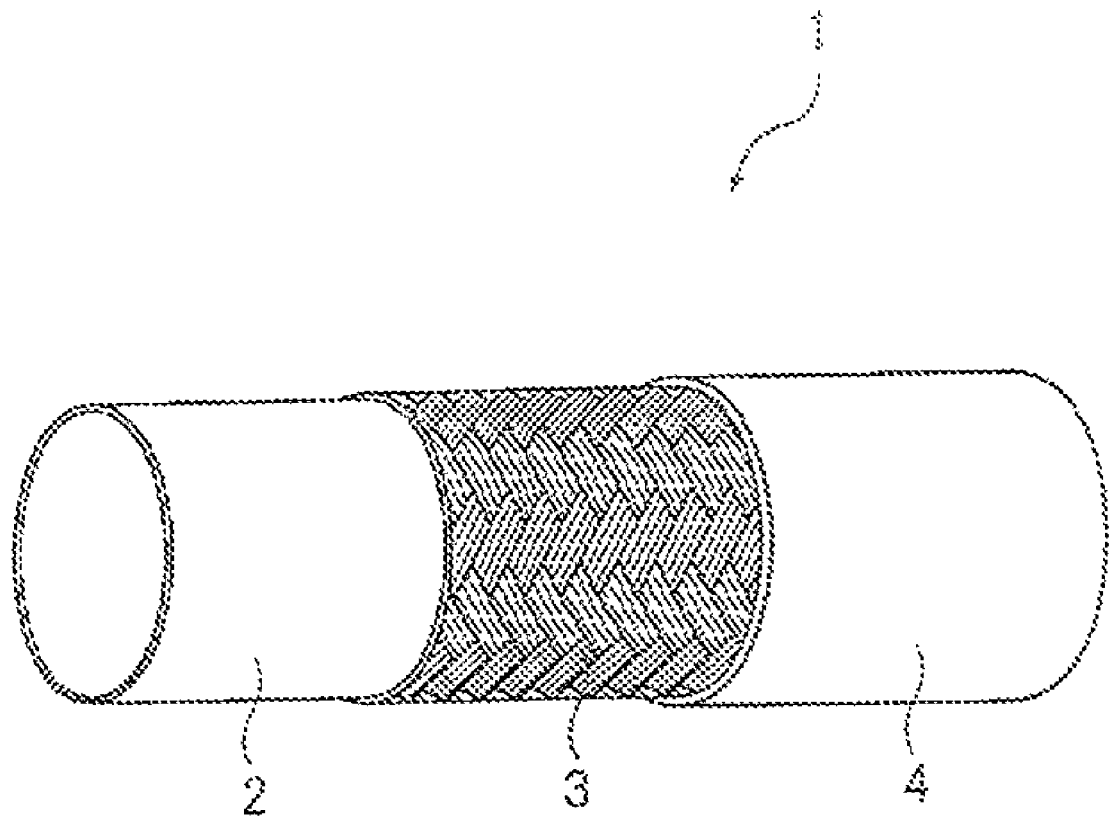
FIG. 1 is a perspective view showing an embodiment of the hose according to the present invention.

1 Hose
2 Rubber inner layer
3 Reinforcement layer
4 Rubber outer layer

BEST MODE FOR CARRYING OUT THE INVENTION

Next, the present invention is described in further detail.

The chlorinated rubber composition of the present invention (hereinafter simply referred to as "the rubber composition of the present invention") comprises a chlorinated rubber, a metal deactivator, an acid acceptor, and an antioxidant.

The metal deactivator is included at a content of at least 0.3 parts by weight in relation to 100 parts by weight of the chlorinated rubber.

The acid acceptor is included at a content of at least 1 parts by weight in relation to 100 parts by weight of the chlorinated rubber.

The antioxidant is included at a content of 0.1 to 10 parts by weight in relation to 100 parts by weight of the chlorinated rubber.

Next, the chlorinated rubber, the metal deactivator, the acid acceptor, and the antioxidant included in the rubber composition of the present invention are described in detail.

<Chlorinated Rubber>

The chlorinated rubber is an rubber elastomer produced by chlorinating and chlorosulfonating a powder or particles of a polyolefin such as polyethylene or polypropylene; a styrene-butadiene block copolymer; or a styrene-isoprene block copolymer.

In the present invention, the method used in the chlorination or chlorosulfonation is not particularly limited, and any method known in the art may be used for the chlorination and chlorosulfonation.

In the present invention, chlorine (Cl) content in the chlorinated rubber is not particularly limited. However, the chlorine content is preferably in the range of 20 to 50% by weight, and more preferably 25 to 45% by weight in view of the balance between workability of the unvulcanized rubber composition and properties of the vulcanized rubber composition such as tensile properties, oil resistance, heat resistance, and cold resistance.

Preferable examples of such chlorinated rubbers include chlorinated polyethylene (CM) such as those prepared by chlorinating polyethylene, chlorosulfonated polyethylene (CSM) prepared by simultaneously chlorinating and chlorosulfonating polyethylene, and chlorinated ethylene-α-olefin copolymer rubber.

Among these, the preferred are CM and CSM in view of favorable weatherability, ozone resistance, heat resistance, flame retardancy, oil resistance, and the like.

Exemplary chlorinated rubbers which may be used in the present invention include commercially available products such as chlorinated polyethylene (product name: Tyrin CM0136, chlorine content: 36%, manufactured by Dupont Dow Elastmer), chlorinated polyethylene (product name: Elaslen 301AE, chlorine content: 32%, manufactured by Showa Denko K.K.), chlorinated polyethylene (product name: Weipren CM6235, chlorine content: 35%, manufactured by Yaxing Chemical), chlorosulfonated polyethylene (product name: Hypalon40S, chlorine content: 35%, manufactured by Dupont), and chlorosulfonated polyethylene (product name: TOSO-CSM CN-530, chlorine content: 35%, manufactured by Tosoh).

In the present invention, the chlorinated rubber may be a mixture of two or more chlorinated rubbers mixed at an arbitrary ratio.

Also, the chlorinated rubber may optionally include a rubber other than the chlorinated rubber (hereinafter referred to as "other rubbers") to the extent that does not adversely affect the object of the present invention.

Examples of such other rubbers include acrylic rubber (ACM), ethyl acrylate-ethylene copolymer (AEM), ethyl acrylate-acrylonitrile copolymer (ANM), ethylene-propylene-diene terpolymer (EPDM), ethylene-propylene copolymer (EPM), ethylene-vinyl acetate copolymer (EVM), fluorinated rubber (FKM), fully hydrogenated nitrile rubber (NBM), epichlorohydrin rubber (CO), ethylene oxide-epichlorohydrin copolymer (ECO), dimethyl silicone rubber (MQ), acrylate butadiene rubber (ABR), butadiene rubber (BR), chloroprene rubber (CR), natural rubber (NR), epoxidated natural rubber (ENR), isoprene rubber (IR), acrylonitrile-isoprene rubber (NIR), butyl rubber (IIR), hydrogenated nitrile rubber (HNBR), nitrile rubber (NBR), styrene butadiene rubber (SBR), styrene-isoprene-butadiene rubber (SIBR), carboxylated butadiene rubber (XBR), carboxylated nitrile rubber (XNBR), carboxylated styrene butadiene rubber (XSBR), brominated butyl rubber (BIIR), chlorinated butyl rubber (CIIR), polysulfide rubber (OT), and polyester urethane (AU), which may be used alone or in combination of two or more.

Such rubber other than the chlorinated rubber used by blending with the chlorinated rubber may be used at an amount up to 30% by weight in relation to the total weight after the blending.

The metal deactivator is a chelating agent having the function of chelating the metal ion to prevent the metal ion from acting as the catalyst. In the present invention, the zinc that has moved into the chlorinated rubber is chelated to thereby suppress the reaction between the hydrogen chloride generated by the dechlorination of the chlorinated rubber and the zinc, and to further prevent the dechlorination induced by the catalytic function of the zinc chloride ($ZnCl_2$) produced by such reaction between the hydrogen chloride and the zinc.

The metal deactivators which may be used in the present invention include heavy metal deactivators known in the art such as benzotriazole derivatives, oxalic acid derivatives, salicylic acid derivatives, hydrazide derivatives, hydroxybenzoic acid anilide derivatives, and sulfur-containing phosphites disclosed in "Manual on Additives for Rubbers and Plastics, New Edition" (Rubber Digest), pages 90 to 91 and "Developments in the Macromolecullar Additives" (The Nikkan Kogyo Shimbun, Ltd.), pages 76 to 85.

Exemplary metal deactivators include 1,2,3-benzotriazole, 3-(N-salicyloyl)amino-1,2,4-triazole, disalicyloylhydrazide decamethylenedicarboxylic acid, N,N'-bis[3-[3,5-di-t-butyl-4-hydroxyphenyl]propionyl]hydrazine, 2,2'-oxamidebis [ethyl-3-(3,5-t-butyl-4-hydroxyphenyl)propionate], bisbenzylidenehydrazide oxalic acid, bis(2-phenoxypropionylhydrazide) isophthalic acid, 2,4,6-triamino-1,3,5-triazine, 3,9-bis[2-(3,5-diamino-2,4,6-triazaphenyl)-ethyl]-2,4,8,10-tetraoxaspiro[5.5]undecane, ethylenediaminetetraacetic acid, alkali metal (such as Li, Na, or K) salt of ethylenediaminetetraacetic acid, and tris[2-t- butyl-4-thio(2'-methyl-4'-hydroxy-5'-t-butyl)phenyl-5-methyl]-phenyl phosphite, which may be used alone or in combination of two or more.

Among these, the preferred is bisbenzylidenehydrazide oxalic acid in view of suppressing the reaction between the hydrogen chloride generated by the dechlorination of the chlorinated rubber and the zinc.

Examples of the commercially available metal deactivator which may be used in the present invention include oxalic acid bisbenzylidene hydrazide (product name: Inhibitor OABH, manufactured by Eastman), 3-(N-salicyloyl)amino-1,2,4-triazole (product name: Adeka Stab CDA-1 and CDA-1M, manufactured by ADEKA), decamethylene dicarboxylic disalicyloylhydrazide (product name: Adeka StabCDA-6, manufactured by ADEKA), N,N'-bis[3-[3,5-di-t-butyl-4-hydroxyphenyl]propionyl]hydrazine (product name: Irganox MD 1024, manufactured by Ciba Geigy), and 2,2'-oxamide bis[ethyl-3-(3,5-t-butyl-4-hydroxyphenyl)propionate] (product name: Naugard XL-1, manufactured by Shiraishi Calcium).

In the present invention, the metal deactivator is incorporated at an amount of at least 0.3 parts by weight, preferably at 0.5 to 20 parts by weight, and more preferably 1 to 10 parts by weight in relation to 100 parts by weight of the chlorinated rubber.

<Acid Acceptor>

The acid acceptor is an additive (stabilizer) which stabilizes the polymer by reacting with the halogenated hydrogen (acid) generated by thermal decomposition or the like of the polymer. In the present invention, hydrogen chloride which is formed in the course of the dechlorination of the chlorinated rubber is trapped to thereby suppress formation of the zinc chloride ($ZnCl_2$) which plays the role of catalyst in the dechlorination.

Exemplary acid acceptors include Ca—Mg—Zn, Ba—Mg—Zn, Ca—Zn—Sn, and Ba—Zn based complex stabilizer; hydrotalcites; fatty acid metallic soaps; inorganic acid salts; and organotin compounds; which may be used alone or in combination of two or more.

Among these, the preferred are Ca—Mg—Zn, Ba—Mg—Zn, Ca—Zn—Sn, and Ba—Zn based complex stabilizer; fatty acid metallic soaps; and hydrotalcites (and in particular, basic carbonate of Mg and/or Al) since they are free from heavy metals such as lead that cause environmental pollution, and they have excellent thermal stability.

Typical fatty acid metallic soaps are alkali metal salts of fatty acid and the preferable examples include lithium salt, potassium salt, and sodium salt of a saturated fatty acid containing 1 to 18 carbon atoms, an unsaturated fatty acid containing 3 to 18 carbon atoms, an aliphatic dicarboxylic acid, and an aromatic carboxylic acid.

In the present invention, the acid acceptor may preferably comprise a combination of hydrotalcite and a fatty acid metallic soap since they are synergetic in trapping the hydrogen chloride.

Exemplary acid acceptors which may be used in the present invention include commercially available products such as sodium stearate (product name: SS-40N, manufactured by Kao), potassium stearate (product name: Nonsoul SK-1, manufactured by NOF Corporation), calcium stearate (product name: calcium stearate G, manufactured by NOF Corporation), Ca—Mg—Zn based complex stabilizer (product name: Adeka Stab RUP 110, manufactured by ADEKA), Ba—Zn based complex stabilizer (product name: Adeka Stab RUP 14, manufactured by ADEKA), and hydrotalcites (product names: DHT-4A, DHT-4A-2, DHT-4C, KW-2000, KW-2100, and KW-2200, manufactured by Kyowa Chemical Industry Co., Ltd.).

In the present invention, the acid acceptor may be included at a content of at least 1 parts by weight, preferably at 1 to 40 parts by weight, and more preferably at 1 to 20 parts by weight in relation to 100 parts by weight of the chlorinated rubber.

<Antioxidant>

The antioxidant is blended for the purpose of suppressing the oxidation chain reaction of the rubber, and in the present invention, the antioxidant is used for the purpose of suppressing generation of radicals in the initial stage of the chlorinated rubber degradation (for example, the polymer radical, polymer hydroperoxide radical, and the like as described below), trapping the polymer radical, and suppressing the binding (curing) of the polymer radical.

Exemplary antioxidants include phenol-based antioxidants, phosphorus-based antioxidant, and sulfur-based antioxidants.

Examples of the phenol-based antioxidants include tetrakis[methylene-3(3',5' di-t-butyl-4-hydroxyphenyl)propionate]methane, n-octadecyl-3-(4'-hydroxy-3',5'-di-t-butylphenyl)propionate, 3,9-bis[2-(3-(3-t-butyl-4-hydroxy-5-methylphenyl) propionyloxy)-1,1-dimethyl ethyl]-2,4,8,10-tetraoxaspiro[5,5]undecane, triethylene glycol-N-bis-3-(3-t-butyl-5-methyl-4-hydroxyphenyl)propionate, 1,6-hexanediol bis[3-(3,5-di-t-butyl-4-hydroxyphenyl) propionate], and 2,2-thio bis-diethylene bis[3-(3,5-di-t-butyl-4-hydroxyphenyl)propionate], which may be used alone or in combination of two or more.

Exemplary phosphorus-based antioxidants include tris (nonylphenyl)phosphite, tris(2,4-di-t-butylphenyl)phosphite, distearyl pentaerythritoldiphosphite, bis(2,4-di-t-butylphenyl) pentaerythritol diphosphite, bis(2,4-di-t-butyl-6-methylphenyl) pentaerythritol diphosphite, bis(2,6-di-t-butyl-4-methylphenyl) pentaerythritol diphosphite, bis(2,4-dicumylphenyl)pentaerythritol diphosphite, tetrakis(2,4-di-t-butylphenyl)-4,4'-diphenylene diphosphonite, 2,2'-methylenebis(4,6-di-t-butylphenyl)2-ethylhexyl phosphite, 2,2'-ethylidene bis(4,6-di-t-butylphenyl) fluorophosphite, bis (2,4-di-t-butyl-6-methylphenyl)ethylphosphite, 2-(2,4,6-tri-t-butylphenyl)-5-ethyl-5-butyl-1,3,2-oxaphosholinane, and 2,2',2"-nitrilo[triethyl-tris(3,3',5,5'-tetra-t-butyl-1,1'-biphenyl-2,2'-diyl) phosphite, which may be used alone or in combination of two or more.

Exemplary sulfur-based antioxidants include dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayltetrakis(3-lauryl thiopropionate), and bis[2-methyl-4-(3-n-$C_{12-14}$ alkyl-thiopropionyloxy)-5-t-butylphenyl]sulfide, which may be used alone or in combination of two or more.

Among these, the preferred are phenol-based antioxidants in view of the improved stabilization and antioxidant effects during the processing.

Examples of the commercially available antioxidants which may be used in the present invention include tetrakis [methylene-3(3',5'-di-t-butyl-4-hydroxyphenyl)propionate] methane (product name: Irganox 1010, manufactured by Ciba Geigy), n-octadecyl-3-(4'-hydroxy-3',5'-di-t-butylphenyl) propionate (product name: Adeka Stab AO-50, manufactured by ADEKA), tris(nonylphenyl)phosphite (product name: Adeka Stab 1178, manufactured by ADEKA), and dilauryl 3,3'-thiodipropionate (product name: Antiox L, manufactured by NOF Corporation).

In the present invention, the antioxidant may be included at a content of 0.1 to 10 parts by weight, preferably at 0.5 to 5 parts by weight, and more preferably at 0.5 to 3 parts by weight in relation to 100 parts by weight of the chlorinated rubber.

The rubber composition of the present invention contains a predetermined amount of each of the chlorinated rubber, the metal deactivator, the acid acceptor, and the antioxidant in relation to the chlorinated rubber, and this enables production of a hose having excellent resistance to degradation by zinc together with sufficient physical properties such as resistance to thermal aging, oil resistance, and adhesion.

The inventors of the present invention estimate that the resistance to degradation by zinc is realized by the following reasons.

Presumably, the main reason for the degradation of the chlorinated rubber by zinc is hardening and embrittlement of the polymer by zinc chloride ($ZnCl_2$) which is formed by the reaction between the chlorine and the zinc. More specifically, the degradation of the chlorinated rubber by zinc is postulated to involve the following elementary reactions (1) to (4).

(1) Dechlorination

The chlorinated polymer under the influence of heat is postulated to undergo the dechlorination represented by the following reaction scheme:

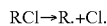
$RCl \rightarrow R\cdot + Cl\cdot$

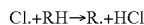
$Cl\cdot + RH \rightarrow R\cdot + HCl$ wherein RCl is the chlorinated part of the chlorinated rubber, RH is the polyolefin part of the chlorinated rubber, R. represents polymer radical, and Cl. represents chlorine radical.

(2) Formation of Zinc Chloride

Presumably, the hydrogen chloride formed by the dechlorination formes zinc chloride ($ZnCl_2$) by reacting with zinc or zinc oxide by the reaction scheme:

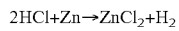
$2HCl + Zn \rightarrow ZnCl_2 + H_2$

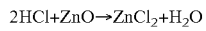
$2HCl + ZnO \rightarrow ZnCl_2 + H_2O$ (3) Chain Reaction of Dechlorination and Radical Formation in the Presence of Zinc Chloride ($ZnCl_2$)

The thus formed $ZnCl_2$ is a Louis acid catalyst which functions as a catalyst in the dechlorination of the halogenated alkyl, and therefore, it should promote dechlorination of the chlorinated rubber and formation of polymer radical.

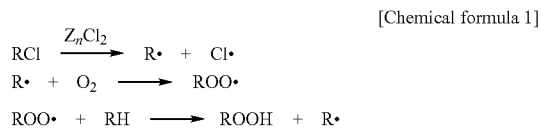

[Chemical formula 1]

wherein ROO. is polymer hydroperoxide radical, and ROOH is polymer hydroperoxide.

(4) Hardening

Mutual binding (hardening) or crosslinking of the thus formed polymer radical results in the increase in the crosslinking density, and the polymer becomes even more brittle. The embrittled chlorinated rubber is subject to crack formation and breakage by the externally applied stress, thereby experiencing the degradation by zinc.

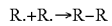
$R\cdot + R\cdot \rightarrow R-R$

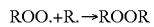
$ROO\cdot + R\cdot \rightarrow ROOR$

Based on such estimation of the mechanism of the degradation by zinc of the chlorinated polymer, the inventors of the present invention arrived at the following integral countermeasure for such zinc degradation of the chlorinated polymer.

(A) Trapping of Chlorine (Countermeasure for Dechlorination and $ZnCl_2$ Formation)

Formation of the $ZnCl_2$ which is the catalyst for the dechlorination can be suppressed if the chlorine that had left the chlorinated rubber could be trapped without delay.

(B) Trapping of Zinc (Countermeasure for $ZnCl_2$ Formation)

Formation of the $ZnCl_2$, and hence, dechlorination can be suppressed if zinc in the chlorinated rubber could be stabilized by chelation.

(C) Trapping of Radical (Countermeasure for Hardening)

Mutual binding (hardening) of the polymer radical, and hence, the embrittlement of the chlorinated rubber can be suppressed if the polymer radical that had been formed could be eliminated.

Incorporation of the metal deactivator as described above at a predetermined amount should prevent, dechlorination of the chlorinated rubber by chelation of the zinc that has moved into the chlorinated rubber; suppress the reaction between the hydrogen chloride generated by the dechlorination of the chlorinated rubber and the zinc; and prevent the dechlorination of the chlorinated rubber promoted by the zinc chloride ($ZnCl_2$) generated in such dechlorination acting as a catalyst (see (B), above).

Incorporation of the acid acceptor at a predetermined amount is believed to enable trapping of the hydrogen chloride generated in the course of the dechlorination of the chlorinated rubber to thereby suppress the promotion of the decomposition of the chlorinated rubber and the generation of the zinc chloride ($ZnCl_2$) by the escaped hydrogen chloride (see (A), above).

Furthermore, incorporation of the antioxidant at a predetermined amount is believed to suppress generation of the radicals generated in the initial stage of the chlorinated rubber deterioration, and facilitate trapping of the polymer radical as well as suppression of the mutual binding of the polymer radical (hardening) (see (C), above).

In the present invention, resistance to degradation by zinc was evaluated as described below and in the Examples.

First, the vulcanized sheet comprising the rubber composition of the present invention having a thickness of 2 mm was brought in contact with a zinc sheet, and after compressing the laminate by 20%, the sheet was left in an oven at 150° C. for 72 hours.

The laminate was allowed to cool to room temperature, and the vulcanized sheet was separated from the zinc sheet. The vulcanized sheet was bent at an angle of 180° C. by using a clip, and the surface on the side that had been in contact with the zinc sheet was checked for the generation of cracks by using a microscope (at a magnification of 100).

The resistance to degradation by zinc was evaluated to be acceptable when no cracks were found on the surface.

If desired, the rubber composition of the present invention may optionally contain additives such as a filler, reinforcing agent, antiaging agent, vulcanizer, vulcanization accelerator, vulcanization aid, plasticizer, pigment (dye), tackifier, lubricant, dispersant, and processing aid at an amount that does not adversely affect the object of the present invention.

The method used for producing the rubber composition of the present invention is not particularly limited, and in an exemplary method, the chlorinated rubber, the metal deactivator, the acid acceptor, and the antioxidant are mixed (kneaded) by an open roll, kneader, extruder, universal agitator, batch kneader, or the like.

The temperature used for the mixing of the components is not particularly limited since the temperature is determined by the apparatus used for the mixing. When a batch kneader is used for the mixing, the mixing is preferably conducted at a temperature of 50 to 160° C., and more preferably at 50 to 120° C.

Also, the time used for the mixing is not particularly limited since the temperature is determined by the apparatus used for the mixing. In the case of a batch kneader, the mixing is preferably accomplished in about 1 to 15 minutes.

The hose of the present invention is a hose comprising the rubber layer(s) formed by using the rubber composition of the present invention and a reinforcement layer adjacent to the rubber layer(s).

A preferred embodiment of the hose of the present invention is shown in FIG. 1. FIG. 1 is a perspective view in which the layers of the hose are partially cut away.

As shown in FIG. 1, hose 1 comprises a rubber inner layer 2 as an inner tube overlaid with a reinforcement layer 3 and a rubber outer layer 4 as an outer tube.

Next, the rubber layers (the rubber inner layer and the rubber outer layer) and the reinforcement layer constituting the hose of the present invention are described in detail.

<Rubber Layer>

The rubber layers are the layers adjacent to the reinforcement layer, and the hose of the present invention has the rubber inner layer and the rubber outer layer.

In the present invention, the rubber inner layer or the rubber outer layer in contact with metal parts are formed by using the rubber composition of the present invention in order to improve resistance to degradation by zinc when such rubber layer became in contact with a zinc-plated joint and other metal parts. Even if the zinc plating is covered by another plating layer of chromium or the like, the rubber composition of the present invention may be used if the exposed zinc may become in contact with the chlorinated rubber.

By forming the rubber layers using the rubber composition of the present invention, a hose having an improved resistance to degradation by zinc can be produced even if the reinforcement layer was formed by using a fiber material or a metal material such as a steel wire for the reinforcement layer.

In the present invention, the rubber inner layer may have a thickness of 0.2 to 4.0 mm, and more preferably 0.5 to 2.0 mm. Similarly, the rubber outer layer may have a thickness of 0.2 to 4.0 mm, and more preferably 0.5 to 2.0 mm.

<Reinforcement Layer>

The reinforcement layer is the layer formed in the exterior of the rubber inner layer as described above for the purpose of maintaining the strength of the product.

In the present invention, the reinforcement layer may comprise either a braid or a coil, and the material used for the reinforcement layer is not particularly limited. Exemplary preferable materials include polyester fibers, polyamide fibers, alamid fibers, vinilon fibers, rayon fibers, PBO (polyparaphenylene benzobisoxazole) fibers, polyallylate fibers, and polyketone fibers. The reinforcement layer may also comprise a metal reinforcement layer, and the metal materials used for such reinforcement layer is also not limited. Exemplary preferable metal materials include hard steel wire (brass plated wires).

Among these, the preferred are polyester fibers and polyamide fibers in view of the improved size stability, heat resistance, and fatigue resistance.

The method used for producing the hose of the present invention comprising the rubber layer and the reinforcement layer is not particularly limited, and any method known in the art can be used in producing such hose of the present invention.

In an exemplary process, the rubber inner layer, the reinforcement layer, and the rubber outer layer may be disposed in this order on a mandrel, and these layers may be adhered by press vulcanization, vapor vulcanization, oven vulcanization (hot air vulcanization), or hot water vulcanization conducted for 30 to 180 minutes under the conditions of 140 to 190° C.

EXAMPLES

Next, the rubber composition of the present invention is described in detail by referring to the Examples which by no means limit the scope of the present invention.

Examples 1 to 14 and Comparative Examples 1 to 14

The components shown in Table 1 were blended at the ratio (part by weight) shown in Table 1 to prepare the rubber composition.

More specifically, the components shown in Table 1 except for the crosslinking agent 1 were kneaded in Banbury mixer (3.4 liters) for 4 minutes, and the content was removed from the mixer when the temperature reached 140° C. The master batch Was thereby obtained.

Next, the crosslinking agent 1 was kneaded with the thus obtained master batch by open rolls to prepare the rubber composition.

The thus obtained rubber compositions were evaluated for their tensile properties after vulcanization, resistance to thermal aging, oil resistance, adhesion, and resistance to degradation by zinc by the procedure as described below. The results are shown in Table 1.

(1) Tensile Properties

The resulting rubber composition was vulcanized for 60 minutes by using a press molding machine at 157° C. under the surface pressure of 3.0 MPa to produce a vulcanized sheet having a thickness of 2 mm. JIS No. 3 dumbbell test pieces were blanked from this sheet, and tensile test was conducted in accordance with JIS K6251-2004 at a tensile speed of 500 mm/minute to measure tensile strength $(T_B)$[MPa], elongation at break $(E_B)$[%], and 50% modulus $(M_{50})$ [MPa] at room temperature.

(2) Resistance to Thermal Aging

The same vulcanized sheet having a thickness of 2 mm as one used in measuring the tensile properties was left in an oven at 150° C. for 72 hours, and the sheet was measured for the elongation at break $(E_B)$ [%] in accordance with JIS K6251-2004.

(3) Oil Resistance

The same vulcanized sheet having a thickness of 2 mm as one used in evaluating the tensile properties was immersed in a test oil (IRM 903, manufactured by Japan Sun Oil Corporation., Ltd.) at 150° C. for 72 hours, and elongation at break $(E_B)$ [%] after the immersion was measured by JIS K6258-2003.

(4) Adhesion

A test piece in the shape of a hose comprising a rubber outer layer comprising the thus obtained rubber composition and a reinforcement layer comprising the nylon 66 fibers (comprising 3 twisted 1000 dtex strands) which had been dipped in RFL solution was prepared by the procedure as described below.

The nylon 66 fibers were braided on a mandrel having an outer diameter of 34 mm to form the reinforcement layer.

Next, an unvulcanized sheet having a thickness of 2.5 mm was formed by using the products of Examples 1 to 14 and Comparative Examples 1 to 14, and this sheet was adhered on the reinforcement layer. This test piece was then vulcanized to prepare the vulcanized test piece.

The rubber outer layer was peeled off the hose-shaped test piece at a peeling speed of 50 mm/min to measure the adhesion strength (unit: N per width of 25 mm).

(5) Resistance to Degradation by Zinc

The same vulcanized sheet having a thickness of 2 mm as one used in measuring the tensile properties was brought in contact with a zinc sheet, and after compressing the laminate by 20%, the sheet was left in an oven at 150° C. for 72 hours.

The laminate was allowed to cool to room temperature, and the vulcanized sheet was separated from the zinc sheet. The vulcanized sheet was bent at an angle of 180° C. by using a clip, and the surface on the side that had been in contact with the zinc sheet was checked for the generation of cracks by using a microscope (at a magnification of 100). When cracks were found, their average length was measured.

TABLE 1

| | Comparative Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Chlorinated rubber 1 | 100 | 100 | 100 | 100 | 100 | 100 | 100 | 100 | 100 | 100 | 100 | 100 | 100 | 100 |
| Magnesium oxide | 30 | 30 | 30 | 30 | 30 | 30 | 30 | 30 | 30 | 30 | 30 | 30 | 30 | 30 |
| Metal deactivator 1 | 0.0 | 0.5 | 2.5 | 5.0 | 0.0 | 10.0 | 15.0 | 0.0 | 0.0 | 0.0 | 0.2 | 0.2 | 2.5 | 0.0 |
| Metal deactivator 2 | 0.0 | 0.0 | 0.0 | 0.0 | 5.0 | 0.0 | 0.0 | 0.0 | 0.0 | 0.0 | 0.0 | 0.0 | 0.0 | 0.0 |
| Metal deactivator 3 | 0.0 | 0.0 | 0.0 | 0.0 | 0.0 | 0.0 | 0.0 | 0.0 | 0.0 | 0.0 | 0.0 | 0.0 | 0.0 | 0.0 |
| Metal deactivator 4 | 0.0 | 0.0 | 0.0 | 0.0 | 0.0 | 0.0 | 0.0 | 0.0 | 0.0 | 0.0 | 0.0 | 0.0 | 0.0 | 0.0 |
| Acid acceptor 1 | 0.0 | 0.0 | 0.0 | 0.0 | 0.0 | 0.0 | 0.0 | 5.0 | 20.0 | 0.0 | 5.0 | 5.0 | 5.0 | 0.0 |
| Acid acceptor 2 | 0.0 | 0.0 | 0.0 | 0.0 | 0.0 | 0.0 | 0.0 | 0.0 | 0.0 | 0.0 | 0.0 | 0.0 | 0.0 | 5.0 |
| Acid acceptor 3 | 0.0 | 0.0 | 0.0 | 0.0 | 0.0 | 0.0 | 0.0 | 0.0 | 0.0 | 0.0 | 0.0 | 0.0 | 0.0 | 2.5 |
| Antioxidant 1 | 0.0 | 0.0 | 0.0 | 0.0 | 0.0 | 0.0 | 0.0 | 0.0 | 0.0 | 0.5 | 2.0 | 0.0 | 0.0 | 1.0 |
| Antioxidant 2 | 0.0 | 0.0 | 0.0 | 0.0 | 0.0 | 0.0 | 0.0 | 0.0 | 0.0 | 0.0 | 0.0 | 2.0 | 0.0 | 0.0 |
| Antioxidant 3 | 0.0 | 0.0 | 0.0 | 0.0 | 0.0 | 0.0 | 0.0 | 0.0 | 0.0 | 0.0 | 0.0 | 0.0 | 0.0 | 0.0 |
| Carbon black 1 | 70 | 70 | 70 | 70 | 70 | 70 | 70 | 70 | 70 | 70 | 70 | 70 | 70 | 70 |
| Processing aid | 3 | 3 | 3 | 3 | 3 | 3 | 3 | 3 | 3 | 3 | 3 | 3 | 3 | 3 |
| Crosslinking aid | 3 | 3 | 3 | 3 | 3 | 3 | 3 | 3 | 3 | 3 | 3 | 3 | 3 | 3 |
| Plasticizer | 10 | 10 | 10 | 10 | 10 | 10 | 10 | 10 | 10 | 10 | 10 | 10 | 10 | 10 |
| Co-crosslinking agent | 2 | 2 | 2 | 2 | 2 | 2 | 2 | 2 | 2 | 2 | 2 | 2 | 2 | 2 |
| Crosslinking agent 1 | 10 | 10 | 10 | 10 | 10 | 10 | 10 | 10 | 10 | 10 | 10 | 10 | 10 | 10 |
| TB (MPa) | 23.5 | 23.2 | 23.0 | 21.2 | 20.9 | 20.2 | 19.7 | 23.0 | 21.0 | 23.2 | 22.5 | 22.2 | 22.4 | 22.7 |
| EB (%) | 130 | 135 | 145 | 152 | 148 | 165 | 180 | 138 | 145 | 140 | 160 | 155 | 160 | 135 |
| M50 (MPa) | 11.1 | 10.9 | 10.5 | 10.1 | 10.2 | 9.5 | 9.2 | 10.8 | 10.1 | 10.5 | 10.1 | 9.8 | 10.2 | 10.8 |
| Resistance to thermal aging: ΔEB (%) | −40 | −40 | −41 | −41 | −40 | −42 | −43 | −42 | −45 | −40 | −38 | −37 | −42 | −35 |
| Oil resistance: ΔEB (%) | −15 | −16 | −16 | −19 | −20 | −22 | −23 | −15 | −14 | −16 | −14 | −16 | −17 | −15 |
| Adhesion: Adhesion strength (N/25 mm) | 80 | 80 | 85 | 89 | 86 | 95 | 100 | 85 | 90 | 80 | 90 | 85 | 90 | 90 |
| Resistance to degradation by zinc: crack length (mm) | 0.45 | 0.35 | 0.23 | 0.19 | 0.18 | 0.11 | 0.11 | 0.34 | 0.32 | 0.40 | 0.34 | 0.32 | 0.12 | 0.08 |

| | Example | | | | | | |
|---|---|---|---|---|---|---|---|
| | 1 | 2 | 3 | 4 | 5 | 6 | 7 |
| Chlorinated rubber 1 | 100 | 100 | 100 | 100 | 100 | 100 | 100 |
| Chlorinated rubber 2 | 0 | 0 | 0 | 0 | 0 | 0 | 0 |
| EPDM | 0 | 0 | 0 | 0 | 0 | 0 | 0 |
| NBR | 0 | 0 | 0 | 0 | 0 | 0 | 0 |
| AEM | 0 | 0 | 0 | 0 | 0 | 0 | 0 |
| Magnesium oxide | 30 | 30 | 30 | 30 | 30 | 30 | 30 |
| Metal deactivator 1 | 2.5 | 5.0 | 5.0 | 2.5 | 5.0 | 5.0 | 0.0 |
| Metal deactivator 2 | 0.0 | 0.0 | 0.0 | 0.0 | 0.0 | 0.0 | 2.0 |
| Metal deactivator 3 | 0.0 | 0.0 | 0.0 | 0.0 | 0.0 | 0.0 | 0.0 |
| Metal deactivator 4 | 0.0 | 0.0 | 0.0 | 0.0 | 0.0 | 0.0 | 0.0 |
| Acid acceptor 1 | 5.0 | 10.0 | 10.0 | 10.0 | 15.0 | 15.0 | 0.0 |
| Acid acceptor 2 | 0.0 | 0.0 | 0.0 | 0.0 | 0.0 | 0.0 | 10.0 |
| Acid acceptor 3 | 0.0 | 0.0 | 0.0 | 0.0 | 0.0 | 0.0 | 0.0 |
| Antioxidant 1 | 1.5 | 1.5 | 0.0 | 2.5 | 1.0 | 0.0 | 1.5 |
| Antioxidant 2 | 0.0 | 0.0 | 1.5 | 0.0 | 0.0 | 0.0 | 0.0 |
| Antioxidant 3 | 0.0 | 0.0 | 0.0 | 0.0 | 0.0 | 1.0 | 0.0 |

TABLE 1-continued

|  | | | | | | | |
|---|---|---|---|---|---|---|---|
| Carbon black 1 | 70 | 70 | 70 | 70 | 70 | 70 | 70 |
| Processing aid | 3 | 3 | 3 | 3 | 3 | 3 | 3 |
| Crosslinking aid | 3 | 3 | 3 | 3 | 3 | 3 | 3 |
| Plasticizer | 10 | 10 | 10 | 10 | 10 | 10 | 10 |
| Co-crosslinking agent | 2 | 2 | 2 | 2 | 2 | 2 | 2 |
| Crosslinking agent 1 | 10 | 10 | 10 | 10 | 10 | 10 | 10 |
| TB (MPa) | 22.1 | 21.8 | 20.4 | 21.5 | 18.5 | 18.5 | 19.3 |
| EB (%) | 175 | 180 | 185 | 185 | 220 | 225 | 190 |
| M50 (MPa) | 9.8 | 9.6 | 9.5 | 9.3 | 8.5 | 8.3 | 9.1 |
| Resistance to thermal aging: ΔEB (%) | −45 | −42 | −43 | −42 | −46 | −47 | −42 |
| Oil resistance: ΔEB (%) | −18 | −17 | −18 | −18 | −20 | −20 | −19 |
| Adhesion: Adhesion strength (N/25 mm) | 95 | 95 | 90 | 95 | 100 | 100 | 90 |
| Resistance to degradation by zinc: crack length (mm) | 0.00 | 0.00 | 0.00 | 0.00 | 0.00 | 0.00 | 0.00 |

| | Example | | | | | | |
|---|---|---|---|---|---|---|---|
| | 8 | 9 | 10 | 11 | 12 | 13 | 14 |
| Chlorinated rubber 1 | 100 | 100 | 100 | 100 | 100 | 100 | 100 |
| Chlorinated rubber 2 | 0 | 0 | 0 | 30 | 0 | 0 | 0 |
| EPDM | 0 | 0 | 0 | 0 | 20 | 0 | 0 |
| NBR | 0 | 0 | 0 | 0 | 0 | 30 | 0 |
| AEM | 0 | 0 | 0 | 0 | 0 | 0 | 30 |
| Magnesium oxide | 30 | 30 | 30 | 30 | 30 | 30 | 30 |
| Metal deactivator 1 | 0.0 | 0.0 | 0.5 | 0.0 | 0.5 | 0.0 | 0.5 |
| Metal deactivator 2 | 0.0 | 0.0 | 0.0 | 0.0 | 0.0 | 0.0 | 0.0 |
| Metal deactivator 3 | 2.5 | 0.0 | 0.0 | 0.0 | 0.0 | 0.0 | 0.0 |
| Metal deactivator 4 | 0.0 | 0.8 | 0.0 | 0.8 | 0.0 | 0.8 | 0.0 |
| Acid acceptor 1 | 0.0 | 0.0 | 0.0 | 0.0 | 0.0 | 0.0 | 0.0 |
| Acid acceptor 2 | 0.0 | 5.0 | 5.0 | 5.0 | 5.0 | 5.0 | 5.0 |
| Acid acceptor 3 | 3.0 | 2.5 | 2.5 | 2.5 | 2.5 | 2.5 | 2.5 |
| Antioxidant 1 | 1.0 | 1.0 | 0.5 | 1.0 | 0.5 | 1.0 | 0.5 |
| Antioxidant 2 | 0.5 | 0.0 | 0.0 | 0.0 | 0.0 | 0.0 | 0.0 |
| Antioxidant 3 | 0.0 | 0.0 | 0.3 | 0.0 | 0.3 | 0.0 | 0.3 |
| Carbon black 1 | 70 | 70 | 70 | 70 | 70 | 70 | 70 |
| Processing aid | 3 | 3 | 3 | 3 | 3 | 3 | 3 |
| Crosslinking aid | 3 | 3 | 3 | 3 | 3 | 3 | 3 |
| Plasticizer | 10 | 10 | 10 | 10 | 10 | 10 | 10 |
| Co-crosslinking agent | 2 | 2 | 2 | 2 | 2 | 2 | 2 |
| Crosslinking agent 1 | 10 | 10 | 10 | 10 | 10 | 10 | 10 |
| TB (MPa) | 20.2 | 22.5 | 21.9 | 22.5 | 21.9 | 22.5 | 21.9 |
| EB (%) | 165 | 140 | 150 | 140 | 150 | 140 | 150 |
| M50 (MPa) | 9.5 | 10.6 | 9.8 | 10.6 | 9.8 | 10.6 | 9.8 |
| Resistance to thermal aging: ΔEB (%) | −42 | −34 | −32 | −34 | −32 | −34 | −32 |
| Oil resistance: ΔEB (%) | −16 | −15 | −14 | −15 | −14 | −15 | −14 |
| Adhesion: Adhesion strength (N/25 mm) | 85 | 90 | 90 | 90 | 90 | 90 | 90 |
| Resistance to degradation by zinc: crack length (mm) | 0.00 | 0.00 | 0.00 | 0.00 | 0.00 | 0.00 | 0.00 |

The components indicated in Table 1 are as described below.

Chlorinated rubber 1: chlorinated polyethylene (product name: Tyrin CM0136, chlorine content: 36%, manufactured by Dupont Dow Elastmer)

Chlorinated rubber 2: chlorosulfonated polyethylene (product name: Hypalon 40S, chlorine content: 35%, manufactured by Dupont)

EPDM: ethylene-propylene-diene terpolymer (product name: MITSUI EPT 4070, ethylene content: 56%, ethylidene norbornene content: 8%, manufactured by Mitsui Petrochemical Industries)

NBR: nitrile rubber (product name: Nipol 1041, nitrile content: 40.5%, Mooney viscosity ML (1+4 at 100° C.): 82.5, manufactured by ZEON Corporation)

AEM: methyl acrylate-ethylene copolymer (product name: VAMAC DP, Mooney viscosity ML (1+4 at 100° C.): 22, manufactured by Mitsui Du-Pont Polychemical)

Magnesium oxide: kyowamag 150 (specific surface area 150 m$^2$/g), manufactured by Kyowa Chemical Industry Co., Ltd.

Metal deactivator 1: bisbenzylidenehydrazide oxalic acid (product name: Inhibitor OABH, manufactured by Eastman)

Metal deactivator 2: N,N'-bis[3-[3,5-di-t-butyl-4-hydroxyphenyl]propionyl]hydrazine (product name: Irganox MD 1024, manufactured by Ciba-Geigy)

Metal deactivator 3: 2,2'-oxamidebis[ethyl 3-(3,5-t-butyl-4-hydroxyphenyl)propionate] (product name: Naugard XL-1, manufactured by Shiraishi Calcium)

Metal deactivator 4: disalicyloylhydrazide decamethylene dicarboxylic acid (product name: Adeka Stab CDA-6, manufactured by ADEKA)

Acid acceptor 1: Ca—Mg—Zn based complex stabilizer (product name: Adeka Stab RUP 110, manufactured by ADEKA)

Acid acceptor 2: hydrotalcite (product name: DHT-4A, manufactured by Kyowa Chemical Industry Co., Ltd)

Acid acceptor 3: sodium stearate (product name: SS-40N, manufactured by Kao)

Antioxidant 1: tetrakis[methylene-3(3',5' di-t-butyl-4-hydroxyphenyl)propionate]methane (product name: Irganox 1010, manufactured by Ciba-Geigy)
Antioxidant 2: tris(nonylphenyl)phosphite (product name: Adeka Stab 1178, manufactured by ADEKA)
Antioxidant 3: dilauryl 3,3'-thiodipropionate (product name: Antiox L, manufactured by NOF Corporation)
Carbon black 1: SRF grade carbon black, manufactured by Asahi Carbon
Processing aid: hydrophilic higher fatty acid ester (product name: Struktol WB212, manufactured by Schill & Seilacher GMBH & CO.)
Crosslinking aid: pentaerythritol (product name: Neulizer P, manufactured by The Nippon Synthetic Chemical Industry Co., Ltd.)
Plasticizer: isononyl trimellitate (product name: C-9N, manufactured by ADEKA)
Co-crosslinking agent: triallyl isocyanurate (product name: TAIC, manufactured by Nippon Kasei)
Crosslinking agent 1: dicumyl peroxide (product name: Percumyl D-40, manufactured by NOF corporation)

Example 15 to 26 and Comparative Example 15 to 29

The components shown in Table 2 were blended at the ratio (part by weight) shown in Table 2 to prepare the rubber composition.

More specifically, the components shown in Table 2 except for the crosslinking agent 2 were kneaded in Banbury mixer (3.4 liters) for 4 minutes, and the content was removed from the mixer when the temperature reached 140° C. The master batch was thereby obtained.

Next, the crosslinking agent 2 was kneaded with the thus obtained master batch by open rolls to prepare the rubber composition.

The thus obtained rubber compositions were evaluated for their tensile properties after vulcanization, resistance to thermal aging, oil resistance, adhesion, and resistance to degradation by zinc by the procedure as described above. The results are shown in Table 2.

TABLE 2

|  | Comparative Example | | | | | | | |
|---|---|---|---|---|---|---|---|---|
|  | 15 | 16 | 17 | 18 | 19 | 20 | 21 | 22 |
| Chlorinated rubber 2 | 100 | 100 | 100 | 100 | 100 | 100 | 100 | 100 |
| Magnesium oxide | 25 | 25 | 25 | 25 | 25 | 25 | 25 | 25 |
| Metal deactivator 1 | 0.0 | 0.5 | 2.5 | 5.0 | 0.0 | 10.0 | 15.0 | 0.0 |
| Metal deactivator 2 | 0.0 | 0.0 | 0.0 | 0.0 | 5.0 | 0.0 | 0.0 | 0.0 |
| Metal deactivator 3 | 0.0 | 0.0 | 0.0 | 0.0 | 0.0 | 0.0 | 0.0 | 0.0 |
| Metal deactivator 4 | 0.0 | 0.0 | 0.0 | 0.0 | 0.0 | 0.0 | 0.0 | 0.0 |
| Acid acceptor 1 | 0.0 | 0.0 | 0.0 | 0.0 | 0.0 | 0.0 | 0.0 | 5.0 |
| Acid acceptor 2 | 0.0 | 0.0 | 0.0 | 0.0 | 0.0 | 0.0 | 0.0 | 0.0 |
| Acid acceptor 3 | 0.0 | 0.0 | 0.0 | 0.0 | 0.0 | 0.0 | 0.0 | 0.0 |
| Antioxidant 1 | 0.0 | 0.0 | 0.0 | 0.0 | 0.0 | 0.0 | 0.0 | 0.0 |
| Antioxidant 2 | 0.0 | 0.0 | 0.0 | 0.0 | 0.0 | 0.0 | 0.0 | 0.0 |
| Antioxidant 3 | 0.0 | 0.0 | 0.0 | 0.0 | 0.0 | 0.0 | 0.0 | 0.0 |
| Carbon black 2 | 75 | 75 | 75 | 75 | 75 | 75 | 75 | 75 |
| Processing aid | 3 | 3 | 3 | 3 | 3 | 3 | 3 | 3 |
| Crosslinking aid | 3 | 3 | 3 | 3 | 3 | 3 | 3 | 3 |
| Plasticizer | 35 | 35 | 35 | 35 | 35 | 35 | 35 | 35 |
| Crosslinking agent 2 | 3 | 3 | 3 | 3 | 3 | 3 | 3 | 3 |
| TB (MPa) | 13.8 | 13.9 | 14.1 | 13.4 | 13.6 | 13.2 | 12.8 | 13.5 |
| EB (%) | 135 | 132 | 130 | 125 | 125 | 115 | 110 | 140 |
| M50 (MPa) | 5.3 | 5.3 | 5.4 | 5.5 | 5.6 | 5.8 | 6.0 | 5.4 |
| Resistance to thermal aging: ΔEB (%) | −16 | −16 | −17 | −17 | −18 | −18 | −20 | −16 |
| Oil resistance: ΔEB (%) | −10 | −10 | −10 | −12 | −11 | −14 | −15 | −10 |
| Adhesion: Adhesion strength (N/25 mm) | 60 | 60 | 60 | 60 | 60 | 60 | 60 | 60 |
| Resistance to degradation by zinc: crack length (mm) | 0.60 | 0.45 | 0.32 | 0.22 | 0.21 | 0.12 | 0.13 | 0.50 |

|  | Comparative Example | | | | | | |
|---|---|---|---|---|---|---|---|
|  | 23 | 24 | 25 | 26 | 27 | 28 | 29 |
| Chlorinated rubber 2 | 100 | 100 | 100 | 100 | 100 | 100 | 100 |
| Magnesium oxide | 25 | 25 | 25 | 25 | 25 | 25 | 25 |
| Metal deactivator 1 | 0.0 | 0.0 | 0.0 | 0.2 | 0.2 | 2.5 | 0.0 |
| Metal deactivator 2 | 0.0 | 0.0 | 0.0 | 0.0 | 0.0 | 0.0 | 0.0 |
| Metal deactivator 3 | 0.0 | 0.0 | 0.0 | 0.0 | 0.0 | 0.0 | 0.0 |
| Metal deactivator 4 | 0.0 | 0.0 | 0.0 | 0.0 | 0.0 | 0.0 | 0.0 |
| Acid acceptor 1 | 20.0 | 0.0 | 0.0 | 5.0 | 5.0 | 5.0 | 0.0 |
| Acid acceptor 2 | 0.0 | 0.0 | 0.0 | 0.0 | 0.0 | 0.0 | 5.0 |
| Acid acceptor 3 | 0.0 | 0.0 | 0.0 | 0.0 | 0.0 | 0.0 | 2.5 |
| Antioxidant 1 | 0.0 | 1.0 | 0.0 | 2.0 | 0.0 | 0.0 | 1.0 |
| Antioxidant 2 | 0.0 | 0.0 | 1.0 | 0.0 | 2.0 | 0.0 | 0.0 |
| Antioxidant 3 | 0.0 | 0.0 | 0.0 | 0.0 | 0.0 | 0.0 | 0.0 |
| Carbon black 2 | 75 | 75 | 75 | 75 | 75 | 75 | 75 |
| Processing aid | 3 | 3 | 3 | 3 | 3 | 3 | 3 |
| Crosslinking aid | 3 | 3 | 3 | 3 | 3 | 3 | 3 |
| Plasticizer | 35 | 35 | 35 | 35 | 35 | 35 | 35 |
| Crosslinking agent 2 | 3 | 3 | 3 | 3 | 3 | 3 | 3 |
| TB (MPa) | 13.1 | 13.9 | 13.8 | 13.5 | 13.5 | 13.8 | 14.1 |
| EB (%) | 145 | 135 | 138 | 142 | 150 | 145 | 135 |
| M50 (MPa) | 5.6 | 5.3 | 5.2 | 5.4 | 5.2 | 5.4 | 5.5 |

TABLE 2-continued

| | | | | | | | |
|---|---|---|---|---|---|---|---|
| Resistance to thermal aging: ΔEB (%) | −12 | −14 | −15 | −14 | −15 | −13 | −15 |
| Oil resistance: ΔEB (%) | −8 | −8 | −8 | −8 | −9 | −10 | −12 |
| Adhesion: Adhesion strength (N/25 mm) | 65 | 60 | 60 | 60 | 60 | 60 | 65 |
| Resistance to degradation by zinc: crack length (mm) | 0.35 | 0.52 | 0.53 | 0.45 | 0.46 | 0.20 | 0.15 |

| | Example | | | | | | | | | | | |
|---|---|---|---|---|---|---|---|---|---|---|---|---|
| | 15 | 16 | 17 | 18 | 19 | 20 | 21 | 22 | 23 | 24 | 25 | 26 |
| Chlorinated rubber 2 | 100 | 100 | 100 | 100 | 100 | 100 | 100 | 100 | 100 | 100 | 100 | 100 |
| Chlorinated rubber 1 | 0 | 0 | 0 | 0 | 0 | 0 | 0 | 0 | 0 | 0 | 30 | 0 |
| EPDM | 0 | 0 | 0 | 0 | 0 | 0 | 0 | 0 | 0 | 0 | 0 | 20 |
| Magnesium oxide | 25 | 25 | 25 | 25 | 25 | 25 | 25 | 25 | 25 | 25 | 25 | 25 |
| Metal deactivator 1 | 2.5 | 5.0 | 5.0 | 2.5 | 5.0 | 5.0 | 0.0 | 0.0 | 0.0 | 2.5 | 0.0 | 2.5 |
| Metal deactivator 2 | 0.0 | 0.0 | 0.0 | 0.0 | 0.0 | 0.0 | 2.0 | 0.0 | 0.0 | 0.0 | 0.0 | 0.0 |
| Metal deactivator 3 | 0.0 | 0.0 | 0.0 | 0.0 | 0.0 | 0.0 | 0.0 | 2.5 | 0.0 | 0.0 | 0.0 | 0.0 |
| Metal deactivator 4 | 0.0 | 0.0 | 0.0 | 0.0 | 0.0 | 0.0 | 0.0 | 0.0 | 0.8 | 0.0 | 0.8 | 0.0 |
| Acid acceptor 1 | 5.0 | 10.0 | 10.0 | 10.0 | 15.0 | 15.0 | 0.0 | 0.0 | 0.0 | 0.0 | 0.0 | 0.0 |
| Acid acceptor 2 | 0.0 | 0.0 | 0.0 | 0.0 | 0.0 | 0.0 | 10.0 | 0.0 | 5.0 | 5.0 | 5.0 | 5.0 |
| Acid acceptor 3 | 0.0 | 0.0 | 0.0 | 0.0 | 0.0 | 0.0 | 0.0 | 3.0 | 2.5 | 2.5 | 2.5 | 2.5 |
| Antioxidant 1 | 1.5 | 1.5 | 0.0 | 2.5 | 1.0 | 0.0 | 1.5 | 1.0 | 1.0 | 0.5 | 1.0 | 0.5 |
| Antioxidant 2 | 0.0 | 0.0 | 1.5 | 0.0 | 0.0 | 0.0 | 0.0 | 0.5 | 0.0 | 0.0 | 0.0 | 0.0 |
| Antioxidant 3 | 0.0 | 0.0 | 0.0 | 0.0 | 0.0 | 1.0 | 0.0 | 0.0 | 0.0 | 0.3 | 0.0 | 0.3 |
| Carbon black 2 | 75 | 75 | 75 | 75 | 75 | 75 | 75 | 75 | 75 | 75 | 75 | 75 |
| Processing aid | 3 | 3 | 3 | 3 | 3 | 3 | 3 | 3 | 3 | 3 | 3 | 3 |
| Crosslinking aid | 3 | 3 | 3 | 3 | 3 | 3 | 3 | 3 | 3 | 3 | 3 | 3 |
| Plasticizer | 35 | 35 | 35 | 35 | 35 | 35 | 35 | 35 | 35 | 35 | 35 | 35 |
| Crosslinking agent 2 | 3 | 3 | 3 | 3 | 3 | 3 | 3 | 3 | 3 | 3 | 3 | 3 |
| TB (MPa) | 14.0 | 14.3 | 14.4 | 14.4 | 13.9 | 14.1 | 14.2 | 13.9 | 14.2 | 13.7 | 14.2 | 13.7 |
| EB (%) | 142 | 145 | 148 | 150 | 142 | 139 | 145 | 142 | 145 | 135 | 145 | 135 |
| M50 (MPa) | 5.4 | 5.5 | 5.6 | 5.8 | 5.9 | 6.1 | 6.2 | 5.5 | 5.6 | 5.5 | 5.6 | 5.5 |
| Resistance to thermal aging: ΔEB (%) | −10 | −8 | −8 | −7 | −8 | −8 | −8 | −9 | −8 | −8 | −8 | −8 |
| Oil resistance: ΔEB (%) | −7 | −6 | −7 | −6 | −7 | −7 | −8 | −10 | −9 | −5 | −9 | −5 |
| Adhesion: Adhesion strength (N/25 mm) | 60 | 60 | 60 | 60 | 60 | 60 | 56 | 55 | 55 | 60 | 55 | 60 |
| Resistance to degradation by zinc: crack length (mm) | 0.00 | 0.00 | 0.00 | 0.00 | 0.00 | 0.00 | 0.00 | 0.00 | 0.00 | 0.00 | 0.00 | 0.00 |

The components shown in Table 2 which are different from those shown in Table 1 are as described below.

Carbon black 2: FEF grade carbon black, manufactured by Nippon Steel Chemical Carbon Co., Ltd.

Crosslinking agent 2: N,N'-m-phenylene dimaleimide (product name: HVA-2, manufactured by Dupont)

As evident from the results shown in Tables 1 and 2, the rubber compositions prepared in Examples 1 to 26 containing the metal deactivator, the acid acceptor, and the antioxidant at the predetermined amount in relation to the chlorinated rubber are rubber compositions which can be used in producing a hose which has excellent resistance to degradation by zinc simultaneously with the physical properties such as resistance to thermal aging, oil resistance and adhesion, in contrast to the rubber compositions prepared in Comparative Examples 1 to 29 not containing such components at the predetermined amount.

Figure 2A:
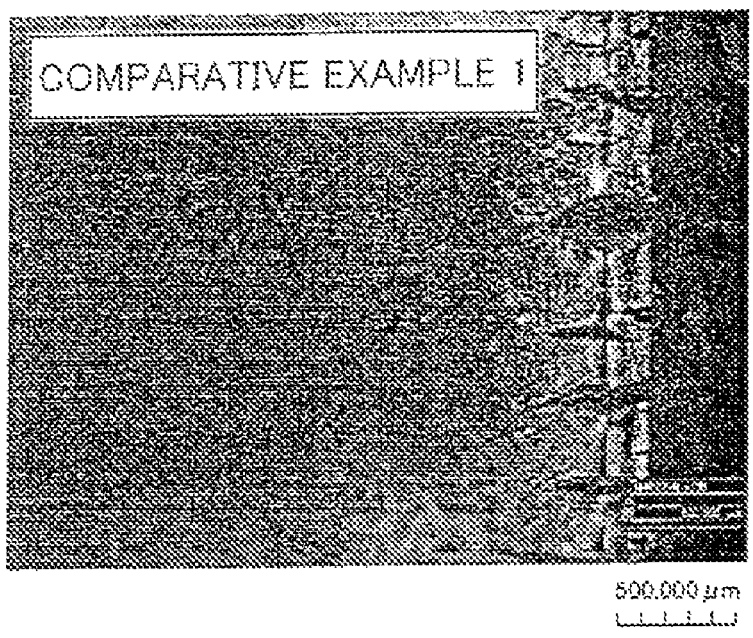
FIG. 2 shows views taken by a microscope used in evaluating the rubber compositions (the vulcanized rubber sheets) produced in Comparative Example 1 and Example 10 for their resistance to degradation by zinc.
Figure 2B:
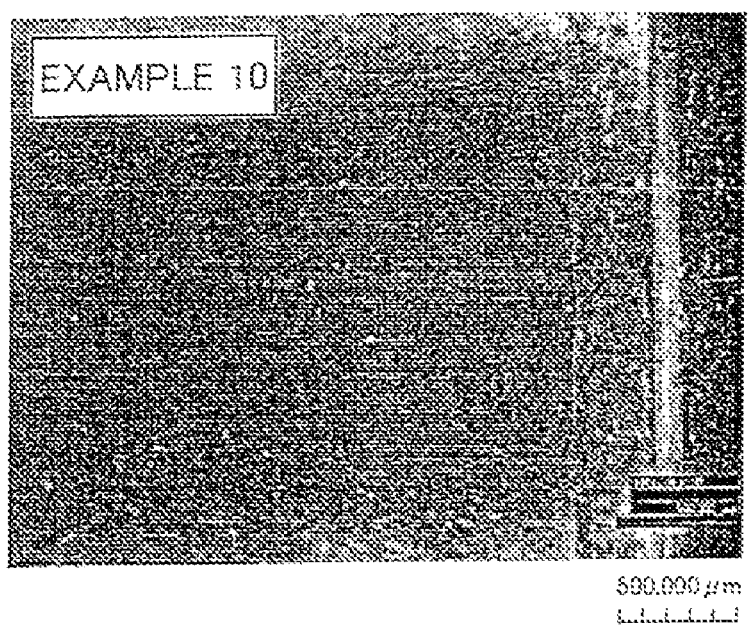
Figure 3A:
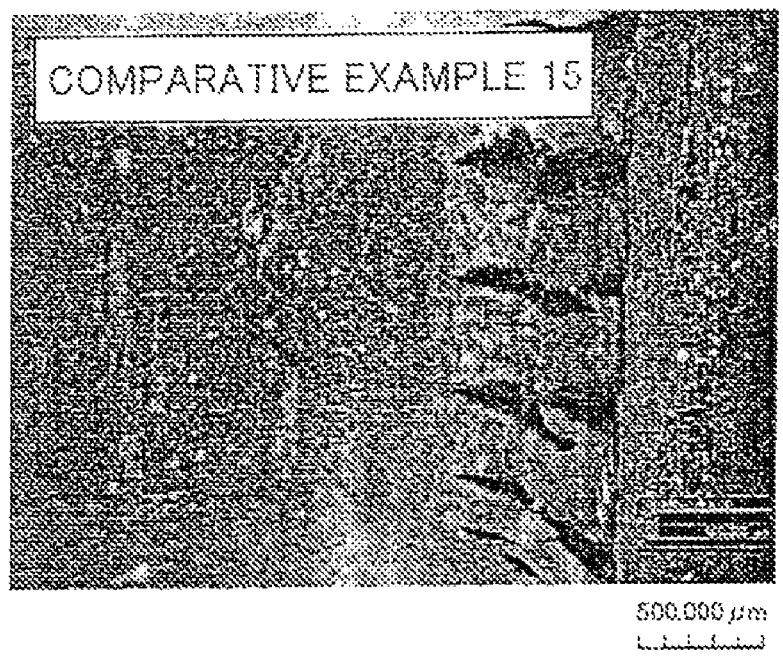
FIG. 3 shows views taken by a microscope used in evaluating the rubber compositions (the vulcanized rubber sheets) produced in Comparative Example 15 and Example 24 for their resistance to degradation by zinc.
Figure 3B:
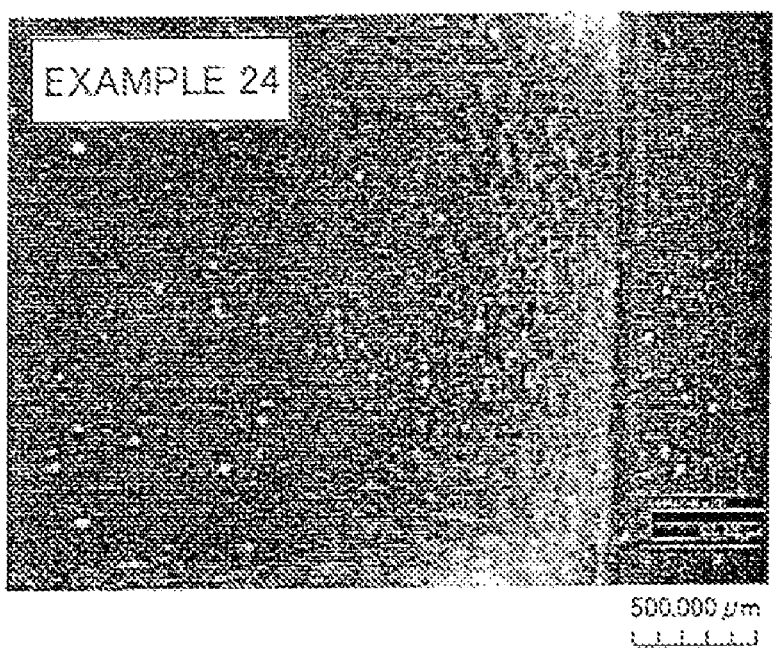

The picture taken by a microscope in the evaluation of the rubber compositions (the vulcanized rubber sheets) prepared in Comparative Example 1 and Example 10 for their resistance to degradation by zinc are shown in FIG. 2. The picture taken by a microscope in the evaluation of the rubber compositions (the vulcanized rubber sheets) prepared in Comparative Example 15 and Example 24 are also shown in FIG. 3. As evident from FIGS. 2 and 3, cracks were confirmed in the vulcanized rubber sheets prepared in Comparative Examples 1 and 15 while no cracks were confirmed in the vulcanized rubber sheets prepared in Examples 10 and 24.

The invention claimed is:

1. A chlorinated rubber composition comprising a chlorinated rubber, a metal deactivator, an acid acceptor, and an antioxidant, wherein
    the metal deactivator is included at a content of 0.3 to 20 parts by weight in relation to 100 parts by weight of the chlorinated rubber,
    the acid acceptor is included at a content of 1 to 40 parts by weight in relation to 100 parts by weight of the chlorinated rubber,
    the antioxidant is included at a content of 0.5 to 5 parts by weight in relation to 100 parts by weight of the chlorinated rubber,
    the metal deactivator is selected from the group consisting of decamethylenedicarboxylic acid disalicyloylhydrazide, N,N'-bis[3-(3,5-di-t-butyl-4-hydroxyphenyl)propionyl]hydrazine, 2,2'-oxamidebis[ethyl 3-(3,5-t-butyl-4-hydroxyphenyl)propionate], and oxalic acid bisbenzylidenehydrazide, and
    the acid acceptor is Ca—Mg—Zn based complex stabilizer or-comprises hydrotalcite and fatty acid metallic soap.

2. A chlorinated rubber composition according to claim 1 wherein the antioxidant is at least one member selected from the group consisting of phenol-based antioxidant, phosphorus-based antioxidant, and sulfur-based antioxidant.

3. A hose comprising a rubber layer and a reinforcement layer adjacent to the rubber layer formed by using the chlorinated rubber composition of claim 1.

4. A hose according to claim 3 wherein the reinforcement layer is formed by using a fiber material.

5. A hose comprising a rubber layer and a reinforcement layer adjacent to the rubber layer formed by using the chlorinated rubber composition of claim 2.

6. A hose according to claim 5 wherein the reinforcement layer is formed by using a fiber material.

* * * * *